July 31, 1951 — W. IMOBERSTEG — 2,562,791
SMALL SOLDERING IRON
Filed Aug. 25, 1948

Inventor
Werner Imobersteg

Patented July 31, 1951

2,562,791

UNITED STATES PATENT OFFICE 2,562,791

SMALL SOLDERING IRON

Werner Imobersteg, Nussbaumen, near Baden, Switzerland

Application August 25, 1948, Serial No. 46,059
In Switzerland May 25, 1948

3 Claims. (Cl. 219—26)

This invention relates to a small soldering iron.

It is the object of the invention to provide a small and handy soldering iron which is particularly adapted for fine soldering work in laboratories, factories making measuring instruments, radio works and especially for outward erecting work, being easily portable and very efficient in spite of its small dimensions.

Another object of the invention is to provide a soldering iron of the type referred to which is adaptable to different voltages.

With these objects in view, my novel soldering iron comprises an electrical heating element accommodated within a soldering bit adapted to be detached from its handle, the particular novel features consisting in that the soldering iron is in the form of a so-called ball-pointed stylograph permitting its carrying in the pocket, and that the electric heating element is exposed after removal of the soldering bit and can be easily disconnected for substitution by an element of a different ohmic resistance for adaptation to different voltages, or for replacement by a new resistance element.

Further details and features of the invention will be seen from the following detailed description in connection with the accompanying drawing showing by way of example and schematically one embodiment of the invention and in which—

Similar reference numerals denote similar parts in the different views.

Figure 1:
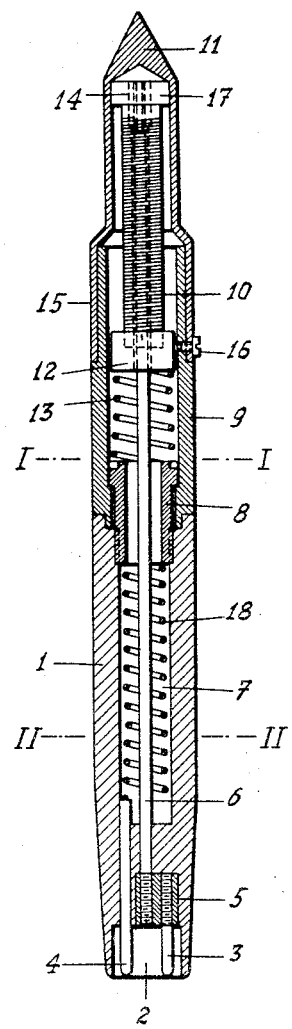
Fig. 1 is an axial section through the small soldering iron, some parts shown in elevation.
Figure 2:
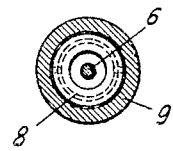
Fig. 2 is a section on line I—I of Fig. 1.
Figure 3:
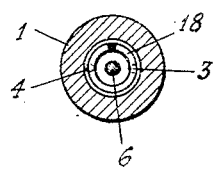
Fig. 3 is a section on line II—II of Fig. 1.

In the drawing, 1 designates a handle of round cross section consisting of insulating material and having at its free end two contact plugs 3, 4 accommodated in a recessed plug socket 2. Plug 3 is seated in a metal socket 5 into which a connecting rod 6 serving as an electrical conductor is screwed. The rod 6 extends exactly in the longitudinal axis of the hollow space 7 in handle 1, passing through a threaded sleeve 8 and a second sleeve 9 of steatite material, its free end bearing an electric heating resistance or element 10 accommodated in the steatite sleeve 9 and in the soldering bit 11 frictionally engaged thereon. The heating element 10 is centered within the soldering bit by its annular collar 17 while at its opposite end a metal ring 12 seats against a pressure spring 13 lying in its turn on one end face of the threaded sleeve 8 and urging the heating element 10 towards the front end of the soldering bit 11. By the threaded sleeve 8 the steatite sleeve 9 is secured to the handle 1 into which the threaded sleeve 8 is screwed. A pressure spring 18 provided in the hollow space 7 and lying against the rear face of sleeve 8 presses against plug 4, so as to establish electrical connection between said plug on the one hand and threaded sleeve 8, pressure spring 13 and metal ring 12 on the other hand, one end of the resistance wire of the heating element 10 being connected to said metal ring 12 and the other end of this wire leading to the inside of the heating element and making contact with rod 6. The heating element 10 is secured in position by means of a nut 14 threadedly engaged on the end of rod 6. The soldering bit 11 is frictionally engaged, by means of a sleeve portion 15, on the steatite sleeve 9, and fixed in position by a clamping screw 16. The whole tool thus takes a form similar to a ball-pointed stylograph and is at least approximately of similar dimensions, in such a way that it lends itself for carrying in a dress pocket.

It will be understood that owing to the accommodation of the heating resistance directly in the soldering bit a very high thermal efficiency is attained. By loosening the clamping screw 16 the soldering bit 11 can be stripped from the steatite sleeve 9, for exposing the heating element 10. In order to replace or interchange the element for one of a different ohmic resistance, it is moved back on rod 6 against action of the pressure spring 13, whereby the nut 14 seated thereon becomes accessible. Having unscrewed the latter from the rod, the heating element can be stripped off from the rod and replaced by a new or different one. Thus it is possible to replace a defective heating element very quickly or to substitute it by a heating element of a different ohmic resistance, in order to adapt the small soldering iron to different voltages.

The handle 1 preferably consists of a moulded or compressed plastic material. Instead of using steatite for the sleeve 9, any other suitable ceramic or other heat-resistant material may be used. As a heating element, a semi-conductor material may be used as well.

It is believed that the many advantages of a device constructed in accordance with this invention will be readily understood, and although the preferred embodiment of the invention is as illustrated and described, it is to be understood that changes in the details of construction may be had which will fall within the spirit and scope of the invention.

What is claimed is:

1. A soldering iron having a heating element exchangeably arranged within a soldering bit detachably secured to a handle, comprising in combination, a rod arranged in the soldering iron and extending through a longitudinal bore of the heating element and substantially throughout the length of the soldering iron; means for guiding said rod in the longitudinal axis of the soldering iron; screw means on said rod holding the heating element in position and forming an electrical connection between said rod and one end of the heating element; a helical spring surrounding said rod and serving as a current lead to the other end of the heating element; a plug arranged in the handle of the soldering iron and including a first pin and a second pin; resilient conductive means of variable length for connecting said first pin to said helical spring; and means for establishing a direct electrical contact between said rod and said second pin, whereby any cables and clamping means thereof are dispensed within the soldering iron.

2. A soldering iron having a heating element exchangeably arranged within a soldering bit detachably secured to a handle, comprising in combination, two parts having overlapping ends and forming the handle; a conductive threaded sleeve connecting said ends of said two parts; a rod arranged in the soldering iron and extending through a bore of the heating element and substantially throughout the length of the soldering iron, said threaded sleeve serving as a guiding means for said rod; screw means on said rod holding the heating element in position and forming an electrical connection between said rod and one end of the heating element; a first helical spring connecting the other end of the heating element and said sleeve; a plug arranged in the handle of the soldering iron and including a first pin and a second pin; a second helical spring connecting said first pin and said sleeve; and means for establishing a direct electrical contact between said rod and said second pin, whereby any cables and clamping means thereof are dispensed with in the soldering iron.

3. A soldering iron having a heating element exchangeably arranged within a soldering bit detachably secured to a handle, comprising in combination, two parts having overlapping ends and forming the handle; a conductive threaded sleeve connecting said ends of said two parts; a rod arranged in the soldering iron and extending through a bore of the heating element and substantially throughout the length of the soldering iron, said threaded sleeve serving as a guiding means for said rod; screw means on said rod holding the heating element in position and forming an electrical connection between said rod and one end of the heating element; a metal part arranged in direct electrical contact with the other end of the heating element; a first helical spring connecting said metal part and said sleeve; a plug arranged in the handle of the soldering iron and including a first pin and a second pin; a second helical spring connecting said first pin and said sleeve; and means for establishing a direct electrical contact between said rod and said second pin, whereby any cables and clamping means thereof are dispensed with in the soldering iron.

WERNER IMOBERSTEG.

REFERENCES CITED

The following references are of record in the file of this patent:

UNITED STATES PATENTS

| Number | Name | Date |
|---|---|---|
| 990,265 | Hertzberg et al. | Apr. 25, 1911 |
| 1,279,321 | Gardner | Sept. 17, 1918 |
| 1,533,292 | Woodson | Apr. 14, 1925 |
| 1,544,554 | Cameron | July 7, 1925 |
| 1,820,799 | Hazlett et al. | Aug. 25, 1931 |
| 2,062,940 | Samuels | Dec. 1, 1936 |
| 2,167,389 | Kuhn et al. | July 25, 1939 |
| 2,213,438 | Young | Sept. 3, 1940 |
| 2,260,030 | Hurst | Oct. 21, 1941 |
| 2,383,699 | Atkinson | Jan. 4, 1945 |

FOREIGN PATENTS

| Number | Country | Date |
|---|---|---|
| 550,333 | Great Britain | Jan. 4, 1943 |